United States Patent [19]
Boehm

[11] Patent Number: 5,798,071
[45] Date of Patent: Aug. 25, 1998

[54] METHOD FOR THE COMBINED INJECTION AND COMPRESSION MOLDING OF GOLF BALLS

[75] Inventor: Herbert C. Boehm, Norwell, Mass.

[73] Assignee: Acushnet Company, Fairhaven, Mass.

[21] Appl. No.: 484,249

[22] Filed: Jun. 7, 1995

[51] Int. Cl.⁶ .............................. B29C 45/14; B29C 43/18
[52] U.S. Cl. ...................... 264/275; 264/271.1; 264/294; 264/296
[58] Field of Search .............................. 264/254, 255, 264/275, 277, 278, 250, 294, 296, 266, 271.1

[56] References Cited

U.S. PATENT DOCUMENTS

| | | | |
|---|---|---|---|
| 3,068,522 | 12/1962 | Nickerson et al. | 264/328.7 |
| 3,147,324 | 9/1964 | Ward | 264/254 |
| 4,203,941 | 5/1980 | Brooker | 264/275 |
| 4,765,853 | 8/1988 | Hoffman | 156/146 |
| 4,959,000 | 9/1990 | Giza | 264/275 |
| 5,006,297 | 4/1991 | Brown et al. | 264/275 |

*Primary Examiner*—Angela Y. Oritz
*Attorney, Agent, or Firm*—Pennie & Edmonds LLP

[57] ABSTRACT

The invention includes a method of manufacturing a golf ball by placing a golf ball core into a preform mold cavity, injection molding a cover around the core, placing the resulting preform into a dimpled compression mold cavity and compression molding the cover to define a golf ball. The invention also includes injection molding a golf ball preform into an outer non-dimpled elongated spherical shape having an elongate axis, and compression molding a spherical golf ball from the preform in a substantially spherical dimpled compression mold cavity.

11 Claims, 6 Drawing Sheets

5,798,071

METHOD FOR THE COMBINED INJECTION AND COMPRESSION MOLDING OF GOLF BALLS

This invention is directed to a method for combined injection and compression molding of golf balls.

PRIOR ART PROCESSES

Modern day golf balls can be generally classified as one-piece, two-piece, and three-piece (also known as "wound"). One-piece balls are injection or compression molded from a homogeneous mass of material with a dimple pattern molded thereon. These are inexpensive and very durable, but do not provide great distance because of their lower compression. They tend to have a soft feel when struck with the club face. Two-piece balls are made by molding a cover about a solid core. These are the most popular types of balls in use today. These balls typically have a hard "cutproof" cover which goes a greater distance, but have lower spin rates resulting in a decreased ability to control the ball. Three-piece or wound balls are made by molding a cover about a wound core. The center is typically made of rubber and can be solid, semi-solid or have a liquid center. A wound core is prepared by winding a lengthy thin thread of elastic material about the center. The wound core is then covered with a durable cover material. Wound balls are generally softer and provide more spin, resulting in increased control over the ball, but typically a shorter distance than a two piece ball. As a result of their more complex construction, the wound balls generally require a longer time to manufacture and are more expensive to produce than two-piece balls. Alternatively, a three-piece ball may be made by molding a cover around a solid core comprising a solid center with a mantle molded about the outside of the enter.

The covers of today's golf balls are made from different materials such as synthetic balata or ionomer resins. Synthetic balata is a type of polyisoprene and is the softest of all other cover types.

Manufacturing a single piece golf ball is relatively simple; a spherical cavity, dimpled on its inner surface, is filled with a polymer or rubber material, typically by compression molding. The ball is formed in one step and finished. Manufacturing a multiple piece golf ball is a more complicated process due to the need to have uniform layer thickness for symmetry. To provide top performance, the balls must perform identically when hit from any direction, and therefore must be symmetrical about any axis. If they are not symmetrical, their spin rates, and therefore lift and distance, will vary depending on the particular angular orientation of the ball. Symmetry, and therefore concentricity, must be precisely controlled in any ball molding process.

Two (or more) piece golf balls typically have ionomer covers molded over one or more inner layers. The covers are typically compression molded or injection molded. U.S. Pat. No. 5,147,657 issued Sep. 15, 1992 to Giza discloses a typical retractable pin mold for injection molding a golf ball cover over a core. Retractable pins extending into the mold cavity support a core as a resinous cover material is injected around the core. The pins, however, must be withdrawn from the cover material when it is soft enough to fill in the pin holes, yet solid enough to support the core. This timing is critical and the process has several drawbacks. The retractable pins are prone to wear and breakage, and are costly to make. The mold itself requires expensive and complicated gates. The timing is difficult to achieve. The gating and retractable pins produce numerous surface blemishes on the ball that must be removed in subsequent manufacturing processes.

Alternatively, a cover can be compression molded about the golf ball core. In this technique, previously molded hemispheres are placed around the core to form a shell. This assembly is then placed between two compression mold halves and the mold halves are heated and pressed together. The shells may be thicker at their deepest points to provide for better surface formation and evacuation of trapped gases. The advantages of this process are that neither fixed pins, retractable pins, nor gates are required in the final cover molding step, although a flash line around the equator generally exists, providing a much smoother cover with less required finishing work. The drawbacks are that half shells must be molded in advance, the core and shell assemblies must be hand or machine assembled and carefully placed in the mold cavity itself to prevent separation. By molding the cover from two half shells, a weak point may be produced at the joint where the two shells melted and flowed together.

SUMMARY OF THE INVENTION

In the process detailed below, the applicant proposes an improvement to each of the above processes that combines the best of each and eliminates the most significant disadvantages of each. The invention includes a method of manufacturing a golf ball by injection molding a single piece golf ball preform that replaces the core and two hemispherical shell assembly. This preform is then compression molded to create the finished golf ball.

DETAILED DESCRIPTION

Figure 1:
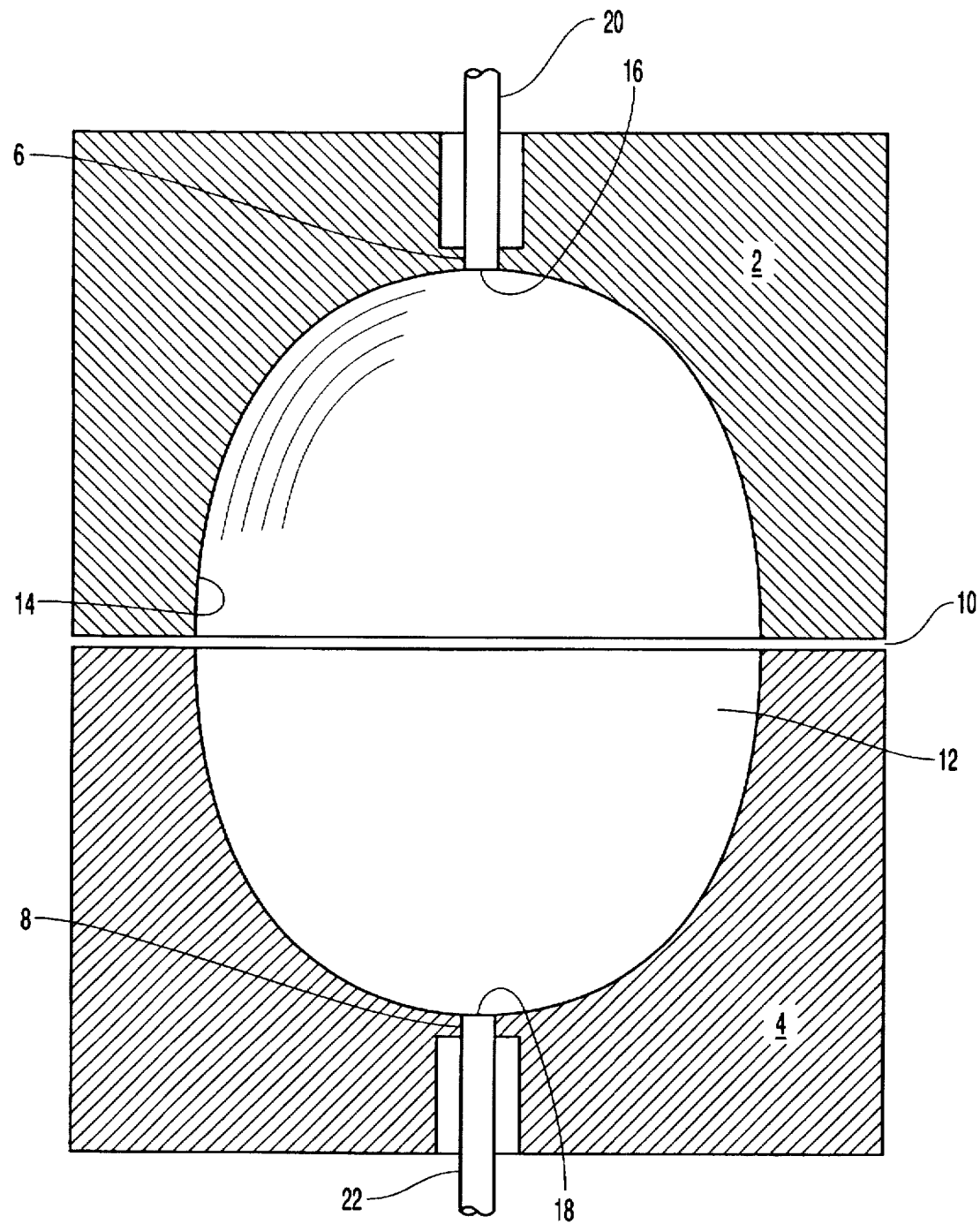
FIG. 1 is a cross-sectional view of a golf ball preform mold in accordance with the present invention.

In FIG. 1, two mold halves 2,4, each with substantially elongated hemispherical mold cavities formed therein and having gates 6,8 for injecting a thermoplastic material, are joined together at a parting line 10. These mold halves 2,4 when joined together in proper registration, form a substantially elongated spherical mold cavity 12 having a smooth inner surface 14. The mold cavity is preferably elongated along a diameter measured between diametral endpoints 16 and 18, which are also the points of greatest depth of each mold cavity in this figure. This diameter is greater than the diameter of the mold cavity 12 measured in the plane of the equatorial parting line 10.

A thermoplastic material is injected into mold cavity 12 through gates 6,8, filling the entire mold cavity with a material that, when cooled, becomes a golf ball preform. A "hot runner" gating system may be used to inject the thermoplastic material. Resin flow control valves 20, 22, actuated by conventional methods, open or close gates 6,8, respectively, to allow plastic into mold cavity 12 or to shut off the flow of plastic into the mold cavity at the inlet to the mold cavity. Since the flow of plastic may be positively stopped after the mold is filled, the plastic can be maintained in a molten state in the runners leading to the mold cavity 12 and the golf ball preform. By using a hot runner system, gates and sprues attached to the molded part are eliminated and hence all intermediate processing between the step of preform molding and compression molding is eliminated as well. A hot runner system therefore provides advantages peculiar to the present invention.

Figure 2:
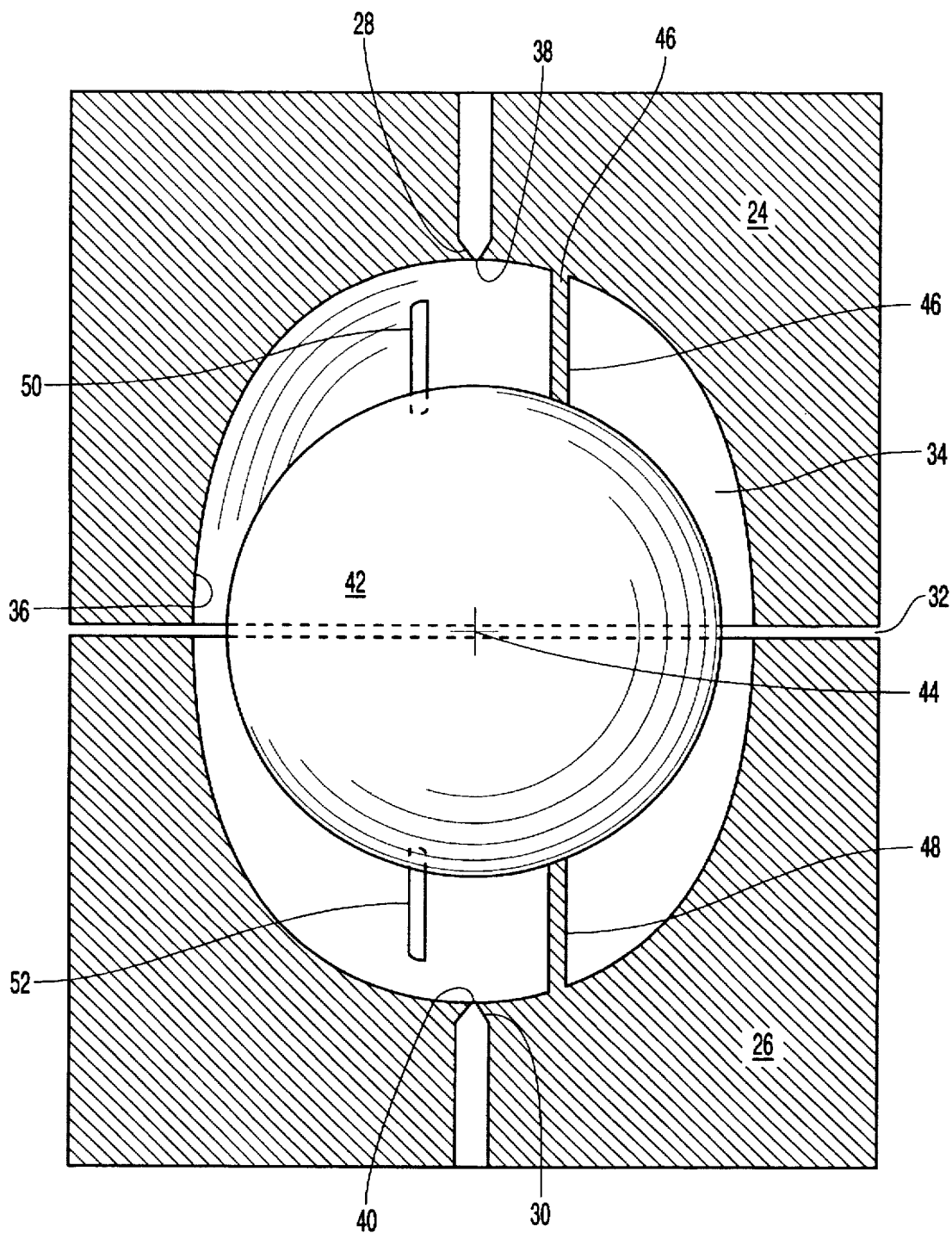
FIG. 2 is a cross-sectional view of another golf ball preform mold in accordance with the present invention.

FIG. 2 shows an alternative embodiment of the invention in which two mold halves 24,26, each with substantially elongated hemispherical mold cavities, and having gates 28,30 for injecting a thermoplastic material, are joined together at a parting line 32. Mold halves 24,26, when joined together in proper registration, form a substantially elongated spherical mold cavity 34 having a smooth inner surface 36. Mold cavity 34 is preferably elongated along a diameter measured between diametral endpoints 38 and 40, the points of greatest depth of the hemispherical cavities formed in mold halves 24,26. This diameter is greater than and perpendicular to a diameter lying in the plane of the equatorial parting line 32.

A substantially spherical golf ball center 42, formed by another manufacturing process, is located within the center 44 of the mold, in a position evenly spaced apart from the inner walls of the mold. To maintain this spacing before and during injection of the thermoplastic material that will form the outer surface of the golf ball preform, golf ball center 42 is supported within the mold cavity by six elongated mold pins. These pins extend from the inner surface 36 of the mold cavity to the outer surface of golf ball center 42. Three pins are located in the end of each mold half 24,26, and extend into the mold cavity. Four of these pins are shown in FIG. 2 at 46,48,50,52. Two are not shown, since they extend from the removed portion of the mold halves.

A thermoplastic material is injected into the mold cavity of FIG. 2 through gates 28,30. This material will fill the void between the golf ball center 42 and the inner all 36 of the mold cavity to create the golf ball preform shown in FIG. 4. A hot runner system, such as that shown in FIG. 1, can be employed in the FIG. 2 embodiment.

Figure 3:
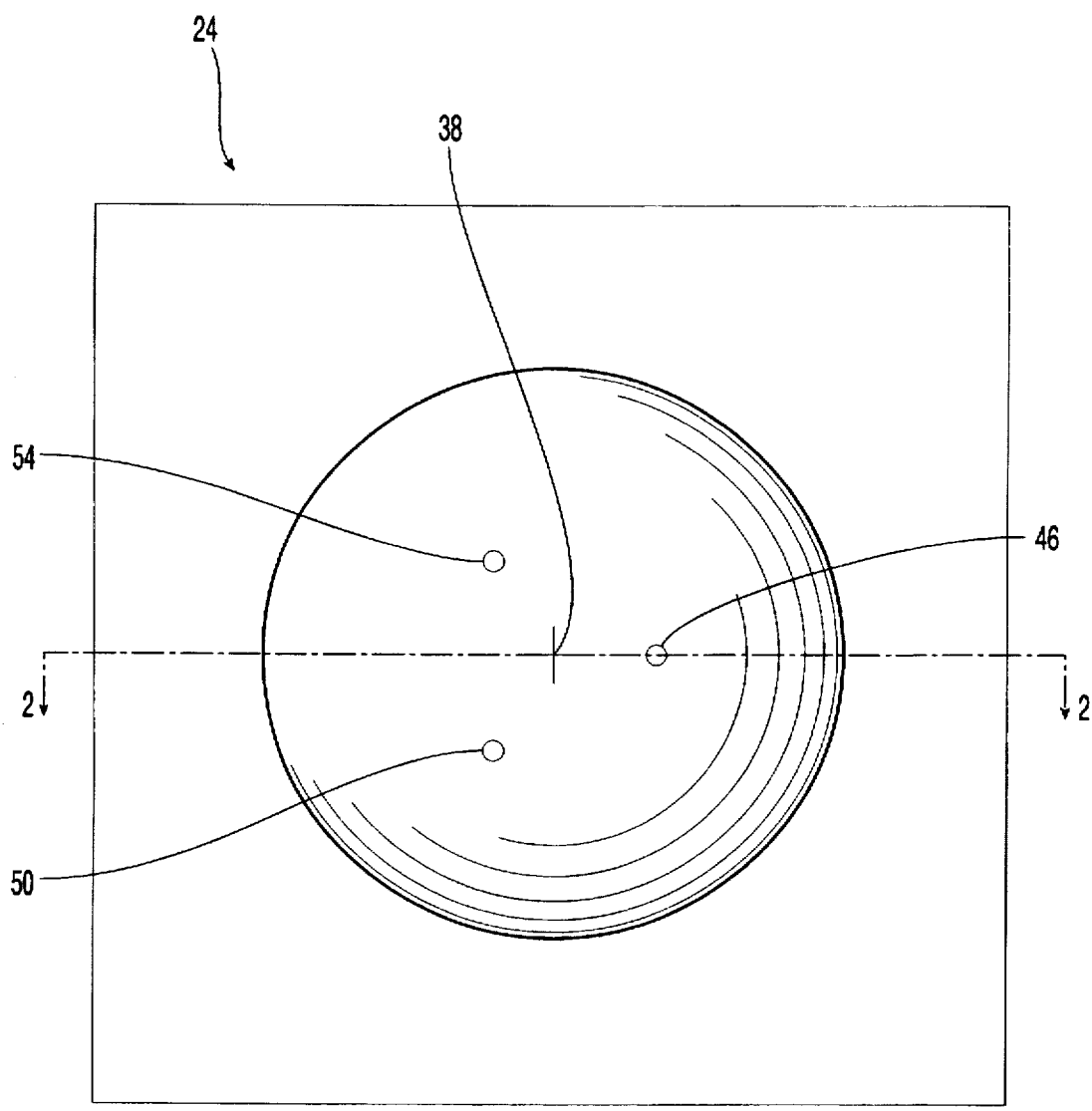
FIG. 3 is an end view of a golf ball mold half with fixed pins extending from its inner surface, the section line 2—2 indicating the section shown in FIG. 2.

In FIG. 3, the two pins 46,50 of mold half 24, are shown extending out of mold half 24 toward the observer. The third pin 54 shown here was also described in the text supporting FIG. 2. Pins 46,50,54 are here shown equidistant from and equiangularly spaced about diametral endpoint 38 of mold cavity 24. Although not shown here, the three pins extending from the cavity in mold half 26 are arranged similarly.

Figure 4:
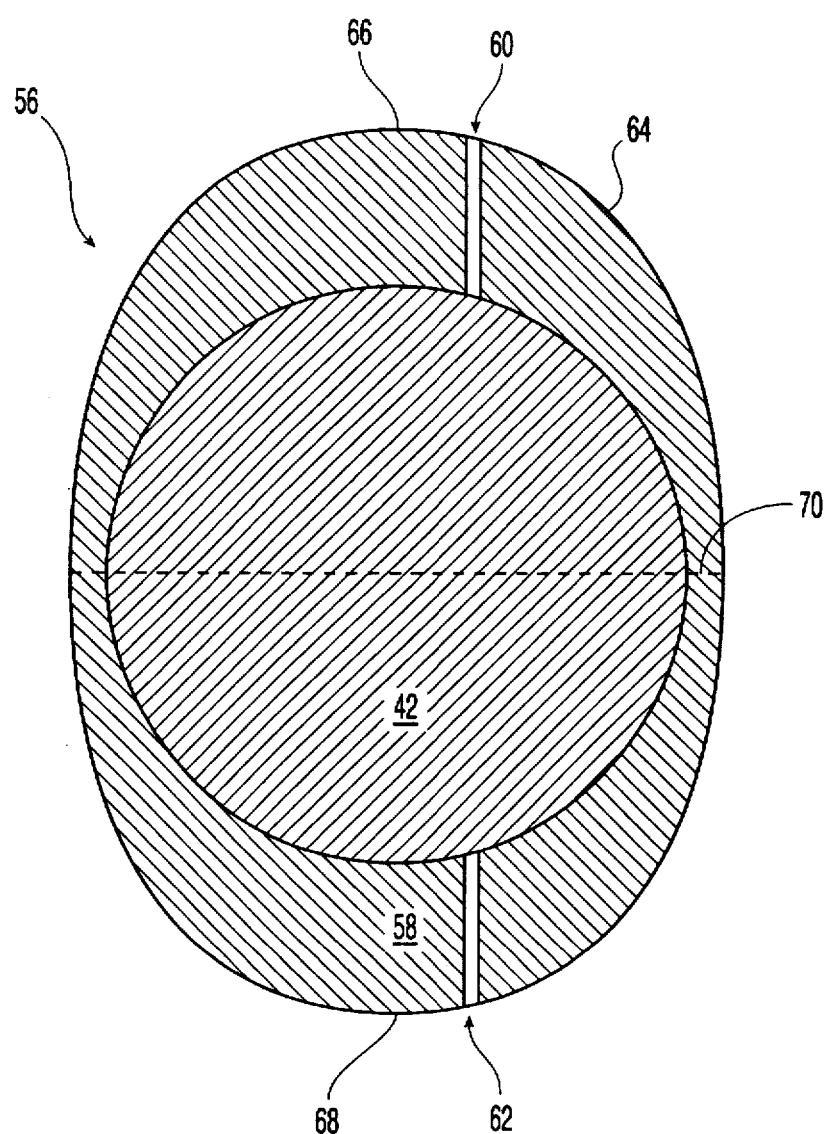
FIG. 4 is a cross-section of a golf ball preform according to the invention.

FIG. 4 discloses a cross-sectional view of a golf ball preform 56 manufactured in the FIG. 2 mold. The preform has two layers: center 42, and an outer cover layer 58. Two holes 60,62 are shown in cross section extending from the surface of center 42 to outer surface 64 of the golf ball preform 56. These holes are the voids left by pins 46,48 of FIG. 2 when the golf ball preform was withdrawn from the golf ball preform mold. Four additional pin holes were left by the pins described and shown in FIGS. 2 and 3, but are not shown in this figure.

Preform 56 is elongated in shape; the axis of elongation, measured from preform endpoint 66 to endpoint 68, is greater than and perpendicular to a diameter lying in plane 70. Plane 70 is perpendicular to the axis of elongation and is shown as a dashed line in this figure.

Figure 5A:
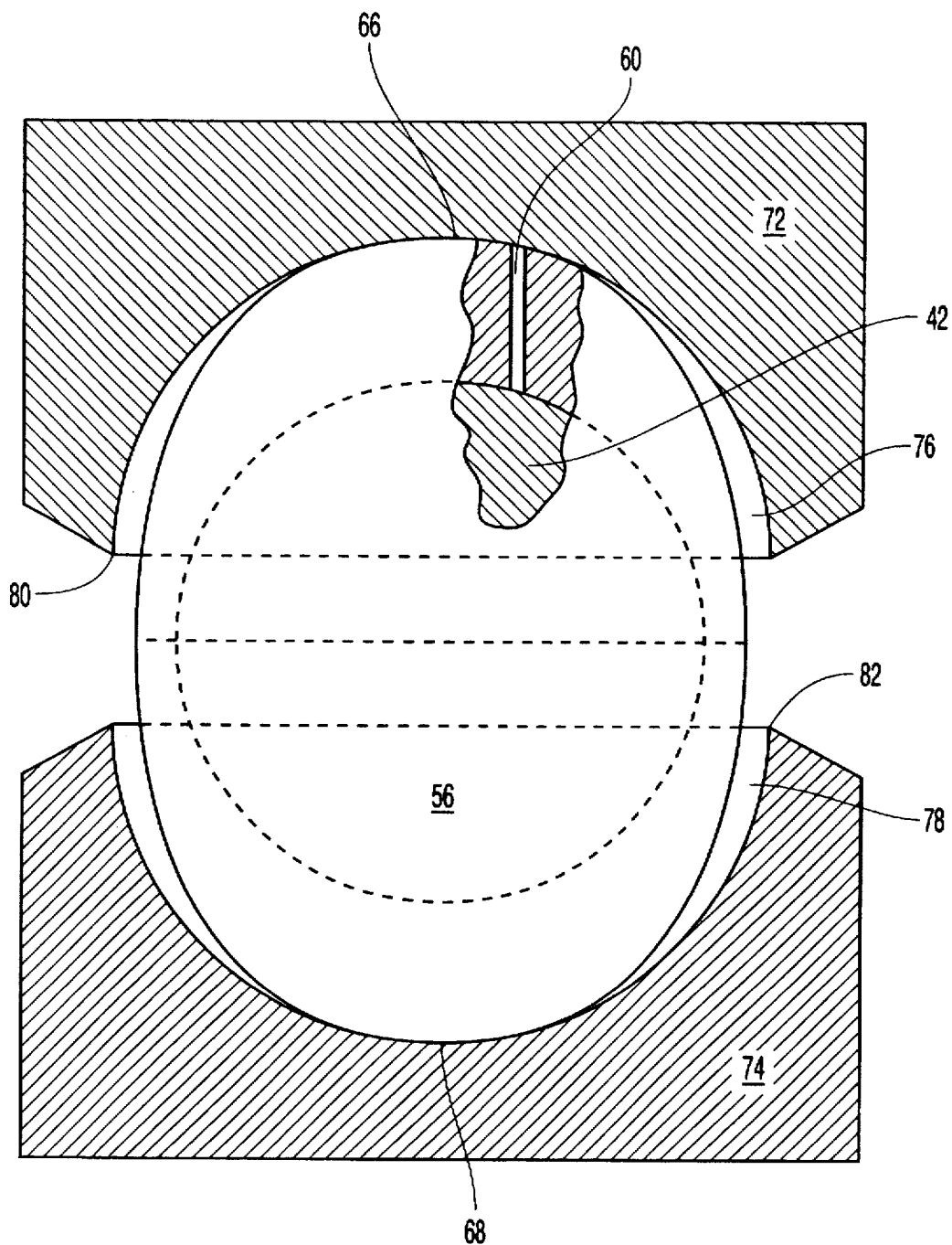
FIG. 5a is a cross-section of a golf ball compression mold partially closed and containing the golf ball preform of FIG. 4.

A preform formed by the molds of FIGS. 1 or 2, such as the preform shown in FIG. 4, is placed in the mold of FIG. 5 and compression molded to create a golf ball with a textured (dimpled) surface. Two mold halves 72,74 each having a substantially hemispherical cavity 76,78, respectively, are oriented with openings facing each other such that when joined they form a substantially spherical mold cavity. The inner surfaces of mold cavities 76,78 are dimpled to provide the proper texture for the golf ball. In FIG. 5, the mold cavities 76,78 are not joined together, but are spaced apart, the inside surface of each cavity touching and supporting endpoints 66,68 of golf ball preform 56 (from FIG. 3). Preform 56 is oriented in the mold with its elongated axis extending between endpoints 66 and 68 perpendicular to the mating surfaces 80,82 of mold halves 72,74.

At this stage in the compression molding process, mold halves 72,74 will be heated and brought together until their respective mating surfaces 80,82 are in contact. As they are pressed together, preform end points 66,68 will begin to melt, and the molten thermoplastic material that forms the outer surface of the preform will flow around the preform until the excess escapes along the parting line formed by mating surfaces 80,82. The elongated construction of the preform fitted into a substantially spherical mold allows the molten material to proceed from a point farthest from the parting line of the mold, displacing air from the ends first, and thereby preventing air from being entrapped in either of the mold halves. The golf ball dimpled surface thus formed is without imperfections due to trapped air. Furthermore, in the case of preforms having more than one layer, the holes left by the fixed pins, such as hole 60, are filled in, leaving no surface imperfections on the finished golf balls, as shown in FIG. 5b below.

Figure 5B:
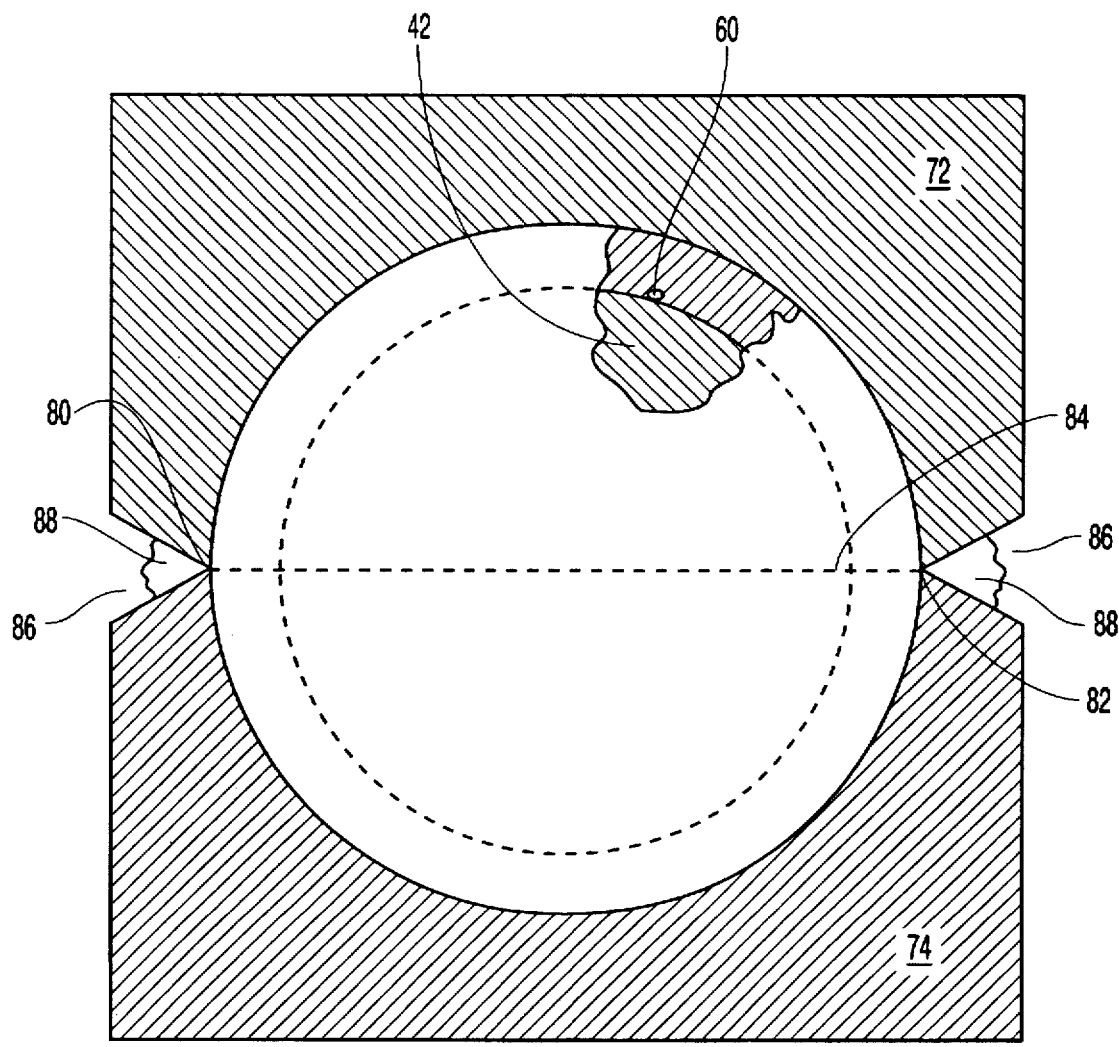
FIG. 5b is a cross-section of the golf ball compression mold of FIG. 5a completely closed.

The mold halves 72,74 are brought together until surfaces 80,82 are in contact with each other, creating a parting line 84 as shown in FIG. 5b. The mold halves joining at parting line 84 are relieved along their outer edges, providing a space 86 around the periphery of mating surfaces 80,82 for excess cover material 88 to accumulate as mold halves 72,74 are forced together and the excess 88 is expelled from the mold cavity.

With the excess preform material 88 removed, and all the gas evacuated from the mold cavity, the preform has been compression molded into a spherical golf ball with a dimpled surface. All pin holes are filled in during the compression step, leaving no surface imperfections. Since the outer layer of the preform was created from a single piece, rather than two halves compression molded and joined together, there are no weak points along the parting line where the two half shells are molded together. Furthermore, since the pin holes are filled in and sealed during the compression molding, fixed pin molding of multiple layer preforms can be used instead of the more expensive retractable pin molding process. The only blemish remaining is a thin witness line along the circumference of the golf ball where the mold halves join which can be easily removed by a buffing process.

I claim:

1. A method of manufacturing a golf ball comprising the steps of:

(a) placing a golf ball core within a golf ball preform mold cavity;

(b) injection molding a cover of a cover material to an elongated shape around said golf ball core to define a golf ball preform;

(c) placing said preform into a dimpled golf ball compression mold cavity; and (d) compression molding said cover around said golf ball core to a spherical shape to define said golf ball.

2. The method of claim 1 wherein the step of placing said golf ball core within said golf ball preform mold cavity further includes the step of:

supporting said golf ball core within said golf ball preform mold cavity on pins extending from an inner surface of said golf ball preform mold cavity and into supporting relationship with said golf ball core.

3. The method of claim 1, wherein said golf ball compression mold cavity comprises first and second mold cavities, each of said cavities having a mating surface for mating with each other along a predetermined plane, and together defining a substantially spherical mold cavity when said mating surfaces are mated, and wherein the golf ball preform has an elongate axis, and wherein the step of compression molding includes the step of moving said first and second mold cavities into mating contact along said predetermined plane, and wherein the step of placing said golf ball preform into said golf ball compression mold cavity includes the step of orienting said golf ball preform within said compression mold cavity such that said elongate axis is substantially perpendicular to said predetermined plane.

4. The method of manufacturing according to claim 1, wherein the step of injection molding a cover around said golf ball core includes a step of molding pin holes in said cover, said holes extending into said cover from an outer surface thereof, and wherein said step of compression molding said cover around said golf ball core includes a step of filling in said pin holes with said cover material.

5. A method of manufacturing a golf ball comprising the steps of:

(a) molding a golf ball preform into an outer elongated spherical shape having an elongate axis; and (b) compression molding a spherical golf ball from said golf ball preform in a substantially spherical dimpled mold cavity.

6. The method of claim 5, wherein the step of compression molding a spherical golf ball includes a step of advancing a first portion of a compression mold toward a second portion of a compression mold in a first direction, and wherein said method of manufacturing a golf ball further comprises the step of orienting said golf ball preform in said first and said second compression mold portions such that said elongate axis of said golf ball preform is substantially parallel to said first direction.

7. A method of manufacturing a golf ball comprising the steps of:

(a) placing a substantially spherical golf ball core within an elongated golf ball preform mold cavity;

(b) molding a cover of a cover material to an elongated shape around said core to define a golf ball preform having an elongate diameter and an equatorial diameter that is perpendicular to the elongate diameter;

(c) orienting said preform within first and second mold cavities together defining a substantially spherical mold cavity when the first and second mold cavities are mated;

(d) moving said first and second mold cavities along a direction generally parallel to the elongate diameter into mating contact; and (e) compression molding said cover around said golf ball core to a substantially spherical shape within said compression mold cavity, thereby defining the golf ball.

8. The method of claim 7, wherein the step of placing said golf ball core within said elongated golf ball preform mold cavity further includes the step of supporting said core within said preform mold cavity on pins extending from an inner surface of said preform mold cavity.

9. The method of claim 8, wherein the step of compression molding said cover around said core includes a step of filling in holes produced by said pins in said cover with said cover material.

10. The method of claim 7, wherein the cover material is thermoplastic.

11. The method of claim 5, wherein the step of molding the preform comprises injection molding the preform into the outer elongated spherical shape.

* * * * *